Figure 1A:
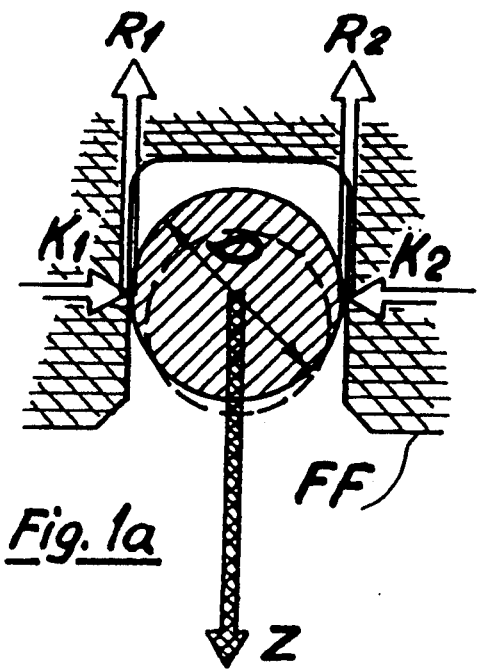

United States Patent [19]

Streng

[11] Patent Number: 5,387,305
[45] Date of Patent: Feb. 7, 1995

[54] METHOD FOR PRODUCING A THEROELECTRICALLY WELDABLE ZONE IN A THERMOPLASTIC MATERIAL

[75] Inventor: Alfred Streng, Niederhasli, Switzerland

[73] Assignee: Streng Plastic AG, Niederhasli, Switzerland

[21] Appl. No.: 120,156

[22] Filed: Sep. 10, 1993

[30] Foreign Application Priority Data

Sep. 22, 1992 [CH] Switzerland .................. 02959/92

[51] Int. Cl.⁶ ............................................. B32B 31/00
[52] U.S. Cl. ........................... 156/257; 156/73.1; 156/73.2; 156/272.2; 156/282; 156/268; 156/498; 156/499; 156/514; 156/517; 83/56; 83/23; 83/25; 83/440; 83/440.1; 83/875
[58] Field of Search ............ 83/56, 23, 25, 440, 83/440.1, 875; 156/73.1, 73.2, 257, 272.2, 282, 268, 498, 499, 514, 517

[56] References Cited

U.S. PATENT DOCUMENTS

| | | | |
|---|---|---|---|
| 2,972,789 | 2/1961 | Mathues | 20/69 |
| 3,574,024 | 2/1969 | Rose | 156/108 |
| 3,674,602 | 7/1972 | Keogh et al. | 156/73.1 |
| 3,706,246 | 12/1972 | Keith | 29/481 |
| 4,416,027 | 11/1983 | Perla | 156/159 |
| 4,470,193 | 9/1984 | Kavel et al. | 156/257 |
| 4,512,883 | 4/1985 | Kridl et al. | 156/94 |
| 4,622,087 | 11/1986 | Ansell | 156/242 |
| 4,626,308 | 12/1986 | Ansell | 156/257 |
| 4,649,641 | 3/1987 | Sichler | 219/542 |
| 5,061,332 | 10/1991 | Stolz et al. | 156/94 |

FOREIGN PATENT DOCUMENTS

| | | |
|---|---|---|
| 0086359 | 8/1983 | European Pat. Off. . |
| 0119738 | 9/1984 | European Pat. Off. . |
| 0302845 | 2/1989 | European Pat. Off. . |
| 0449795 | 10/1991 | European Pat. Off. . |
| 0453208 | 10/1991 | European Pat. Off. . |
| 2388930 | 11/1978 | France . |
| 60-24503 | 2/1985 | Japan . |
| 3205215 | 5/1988 | Japan .................. 156/73.1 |
| 3132334 | 6/1991 | Japan .................. 156/73.1 |
| 2040013 | 8/1980 | United Kingdom . |
| 2137298 | 10/1984 | United Kingdom . |

*Primary Examiner*—W. Gary Jones
*Assistant Examiner*—Mark De Simone
*Attorney, Agent, or Firm*—Walter C. Farley

[57] ABSTRACT

The process for the production of a thermoelectrically weldable zone in thermoplastic materials is significantly improved by the true-to-size, air-free embedding of the heating conductor at a clearly defined depth below the joining surface. For this purpose in a first process step a sublevel wire bed bottom is cut in the material, in which is cut a substantially inverted T-shaped incision, running in two planes and at the desired depth, measured from the material surface and, following the surface profile, the cut is passed along the heating conductor insertion line. Using the same tool the cover strips formed are raised and stretched along the path of cut, so that an open channel is formed with the sublevel wire bed bottom. Preferably in the same operation the wire bed is also cut true-to-size with a cutting tool and corresponding to the heating conductor. In a later process step the heating conductor is placed through the still open channel, the cover strips are pressed and then melted. What is left behind is a groove-free, smooth joint surface, over which extends a fine, non-raised melt scar.

11 Claims, 6 Drawing Sheets

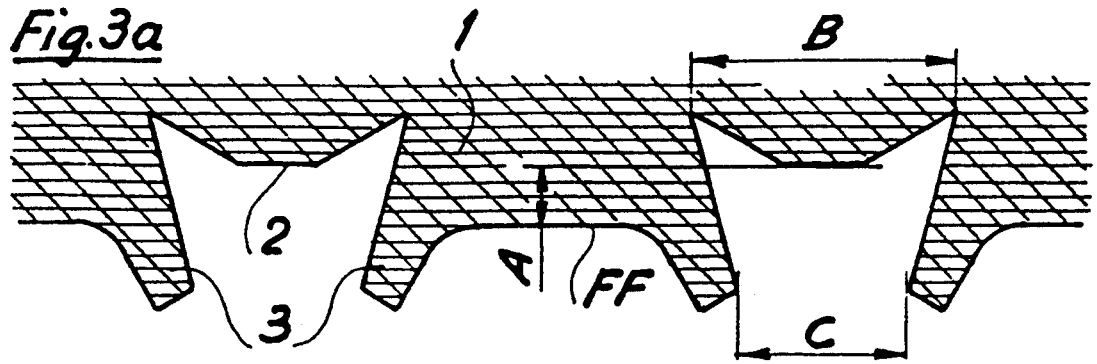
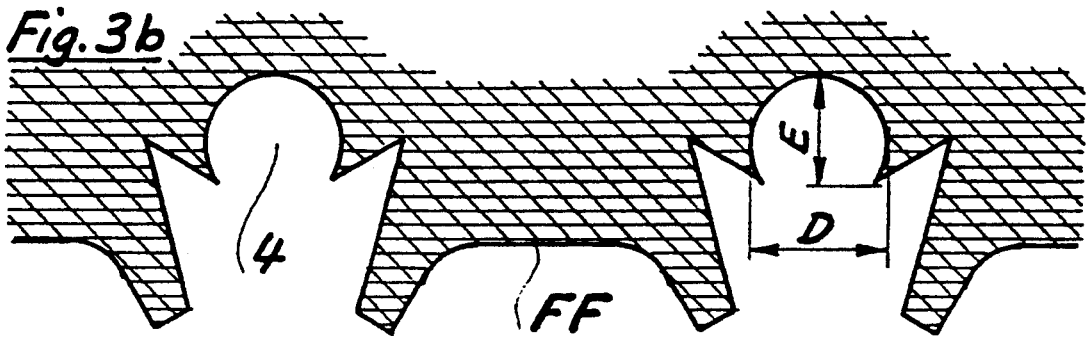
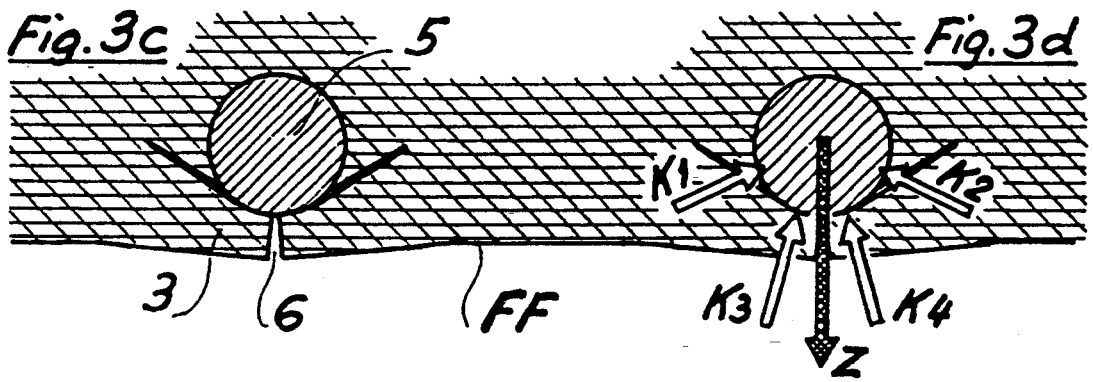
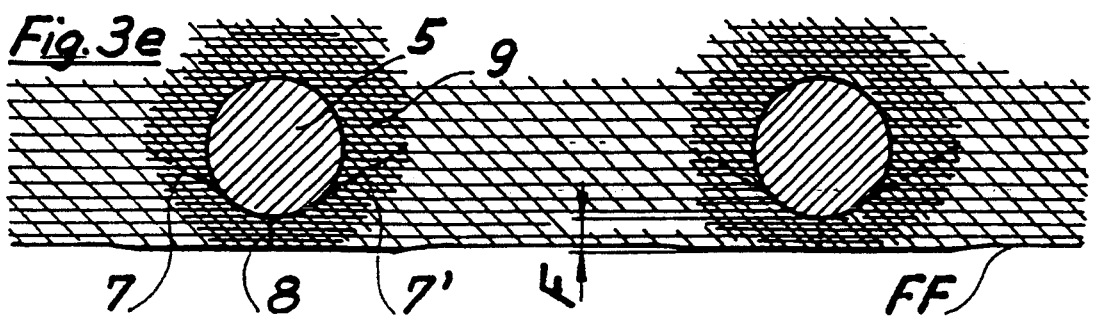

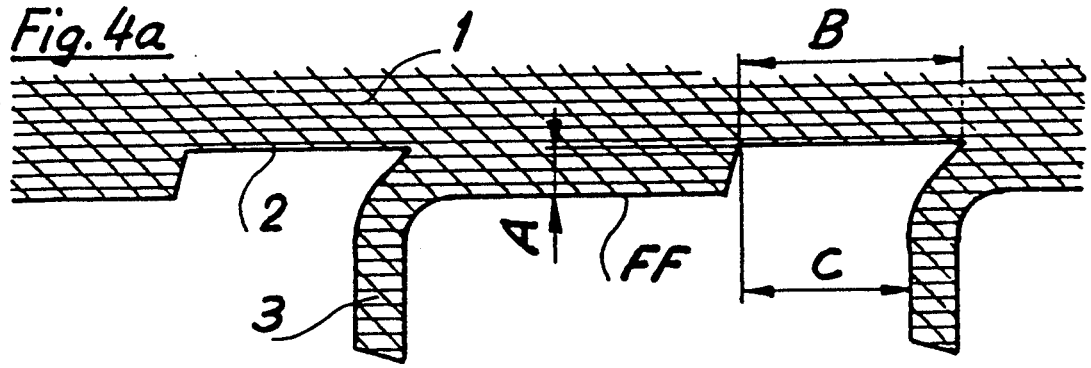
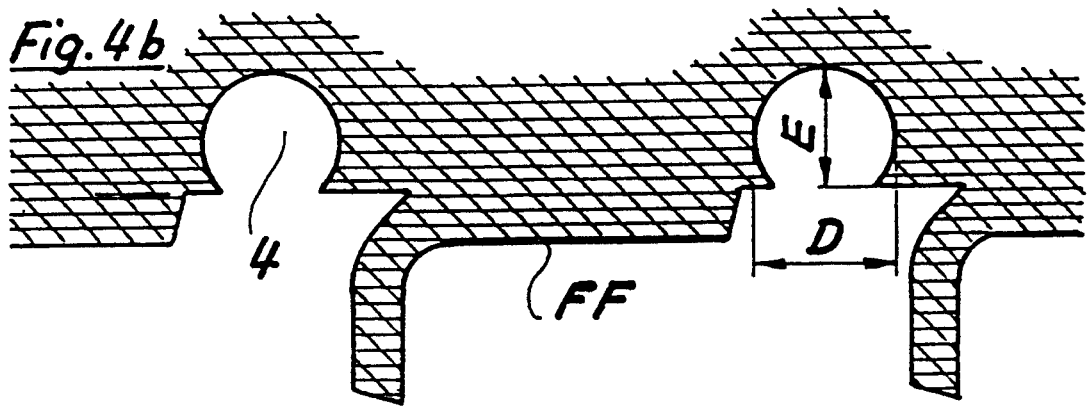
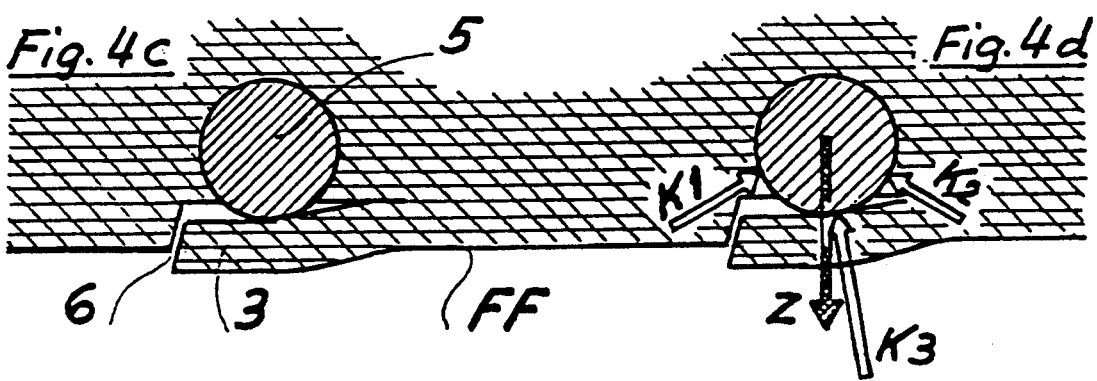
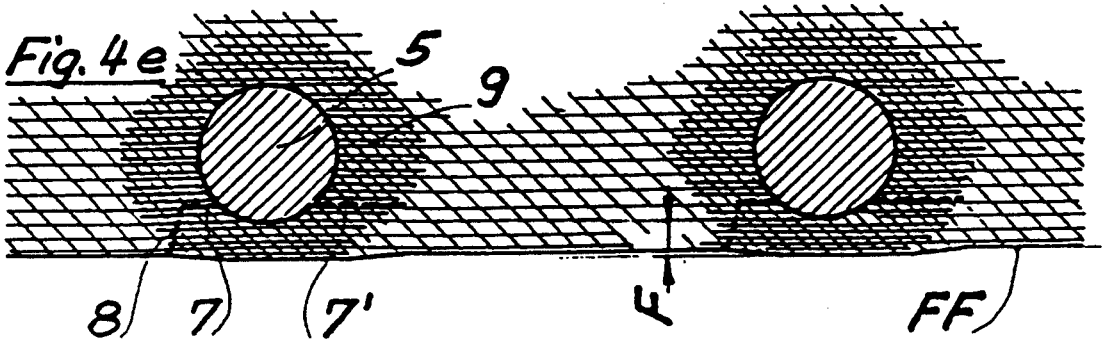

METHOD FOR PRODUCING A THEROELECTRICALLY WELDABLE ZONE IN A THERMOPLASTIC MATERIAL

The invention relates to a process for the production of electric weldable surfaces on thermoplastic materials, as well as to the articles produced by this process.

The functionality of e.g. electric weldable pipeline parts or electric welded fittings, i.e. welded sleeves or rings, such as are used for the construction of thermoplastic material pipelines, is essentially dependent on the position of the heating conductor with respect to the inner face of the sleeve body essential for the pipe joint and the outer surface of the pipe body. A further important criterion is that the heating conductor is so embedded in the fitting body that the entire heating wire surface participates in the direct heat transfer to the material in the joining zone for welding the pipe and pipeline part in the form of thermoplastic melt. In addition, the heating conductor must be so stabely anchored in the fitting material, that the thermal expansion of the heating wire material during energy input in increasingly softening or melting ambient material does not lead to uncontrolled wire movements, mainly in the axial direction of the pipe joint, which could lead to short-circuit contact of individual wire turns causing local overheating.

Thus, in summarizing, the following requirements are made on the energy introduction mechanisms for a satisfactorally functioning electric weldable fitting. The heating conductor must be located in the fitting body with a dimensionally fixed, very small spacing from the joining surface. Without significant air inclusions, the heating conductor must be completely enveloped by the fitting material. Insulating air leads to zones of overheated wire surfaces. The joining surface must, after the introduction of the heating conductor, have a very smooth and uniform surface area. Grooves and bead-like combs, which are prejudicial to the melting process as a result of additional, insulating air layers between the surfaces to be welded and also provide a considerable risk of air inclusions (pipes) during the welding process are not desired.

This leads to electrically welded zones on randomly shaped surfaces, i.e. saddle surfaces, planes, etc. give satisfactory results. These requirements apply in general form for the welding of thermoplastics by means of embedded heating wires. As plastic is only welded under pressure, it must also be necessary to ensure the production of an adequate melting or joining pressure, which is also an important welding quality criterion (temperature, time, joining pressure).

Thus, e.g. Swiss patent 515449 in connection with the production of electric welding sleeves, describes different constructional criteria with the main aim of protecting from contact the heating conductor wire. In this relatively early technology, in none of the variants shown in FIGS. 1 to 3 are all the criteria of the aforementioned requirements fulfilled and instead the heating conductor is at a considerable distance from the joining surface and/or there is an inadequate anchoring of the heating conductor in the sleeve body with unacceptable cavities and air inclusions.

Further exemplified improvement proposals regarding processes and the associated apparatuses are described in European patents 58175 and 86359. In a single operation the heating conductor is inserted in a thermoplastic material, tubular sleeve body. In both these methods and using a cutting tool which is not further defined with respect to the cutting edge geometry, the inner face of the bore of the sleeve body is cut open to form a spiral slot and simultaneously through a guide adapted to the heating conductor wire through the cutting tool, the heating conductor is inserted in said spiral slot and the ejected material is pressed as satisfactorily as possible over the inserted wire. Therefore both these publications describe very similar methods, the final result differing only slightly from the variant described according to FIG. 4 in the aforementioned Swiss patent 515449. Account is taken of the known disadvantage that a significant proportion of the bare heating conductor surface, as least during the initial phase of the welding process, is open to the ambient air, so that said portion of the heat exchange surface only indirectly, following the filling of the free spaces between the sleeve body and the pipe ends to be welded, participates in active manner in the formation of the melt. It is also disadvantageous that up to the time of the complete melt embedding of the heating conductor, its air-insulated surface fraction can reach uncontrolled high temperatures. During this time there is also a considerable risk of bubble formation as a result of air encapsulated in melt fractions and from the cavities along the spiral path of the heating conductor there would be no continuous and uniform outward displacement thereof.

The process of European patent 119738 attempts to improve the deficiencies occurring during energy transfer of the above-discussed procedure for introducing the heating conductor in a sleeve body by using a fundamentally different groove formation. In this case the elastic characteristics of the sleeve material are utilized, in that the plastic material is displaced, the wire is inserted in the resulting slot, the displacement is stopped and the wire is then secured and therefore retained. However, it has proved disadvantageous that as a result of the ploughing of the surface there is a plastically deformed, thick material bead, which must partly or entirely be pressed over the heating conductor. As a result of the inclined incision the heating conductor wire is better surrounded, provided that the slot has been cut sufficiently deeply. However, the deep incision has the necessary consequence that the heating conductor is positioned relatively deeply in the sleeve body, which has a negative influence on the welding characteristics of the electric welding sleeve. If, in order to remove this disadvantage, there is only a minimum depth cutting of the slot, there is a risk of the heating conductor partly slipping out of the spiral slot again during the welding process as a result of the inadequate displacement and reaction forces, which would lead to unusable rejects. On covering the wire a spiral bead forms as a result of the pressing of the ploughed edge along the insertion line and this can contribute to air inclusion formation in the joint area between the sleeve and the pipe.

What would initially appear to be the advantageous method of ploughing in the heating conductor by cutting the surface, insertion and fixing the same by reaction forces, suffers from the serious disadvantage that with the inserted heating conductor the corresponding volume proportion of the thermoplastic material is not removed and is instead only displaced to a limited extent and is then left behind in disturbing form as groove and bead shapes in the joint surface. The resulting disadvantages during the welding of two surfaces were referred to hereinbefore.

As in the case of the winding methods described hereinbefore, also in the inclined incision the wire is under tension, which leads to latent radial forces. If in a local or limited area said radial force component rises above the retaining frictional forces, then the heating conductor wire will slide radially inwards into the spiral slot until the equilibrium of forces is restored. It is not possible to accurately predetermine the distance between the heating conductor wipe and the bore surface in the sleeve body.

At least during the insertion operation the wire is essentially secured by mechanical friction between the sleeve material and the heating conductor material in the sleeve body, which only functions to a relatively reliable extent with considerable clamping forces due to the generally small friction coefficient between the thermoplastic material and the metal wire. This framework condition can in turn lead to high tensile loading in the heating conductor wire. As a result e.g. a thin, soft copper wire can be permanently stretched, which necessarily uncontrollably increases the ohmic resistance of the heating winding and for functionally correct, close manufacturing tolerances also leads to costly rejects.

A general problem existing on inserting the heating conductor wire simultaneously with slot cutting is that as a function of the design of the wire passage through the cutting tool, there is a considerable fault risk due to tool breakage and/or jamming of the heating conductor wire. Either in the case of an adequate wall thickness of the cutting tool around the wire passage an excessive widening of the insertion slot is accepted, as illustrated by broken line circles in FIGS. 1a, b and c, or this is avoided by using very thin walls, which risks a tool breakage. It is only possible to make a compromise and instead of using an optimum processing speed, to prepare the embedding so that the heating wire is embedded under optimum conditions and with a tool optimized for the embedding process, so that there is less friction and less surrounding damage, so that one is literally forced to adopt a "pass in between" procedure. For example the machine speed is made correspondingly slower to minimize production problems, which casts into doubt the hitherto assumed economic aspect of a combining of the two process steps "cut spiral slot" and "insert heating conductor wire" as opposed to performing these two steps individually.

What is desired is a process for producing electric weldable zones, which fulfill the aforementioned conditions. Therefore the process must not make the product more expensive.

The invention defined in the claims makes it possible to produce electric weldable surfaces for fittings, such as electric welding sleeves, rings and the like, which naturally also have planar surfaces.

An embodiment of the invention is described hereinafter with respect to a process for the introduction of the heating conductor wire in a body made from a thermoplastic material, e.g. an electric welding sleeve, with three possible spiral slot shapes, which are produced by the strung together steps according to the invention. The insertion in other, randomly shaped surfaces takes place in the same way.

The invention is described in greater detail hereinafter relative to the drawings, wherein show:

FIG. 1a In section, part of a known spiral slot shape with heating conductor during the insertion process, the influence of the geometrical shape of the spiral slot on the force distribution is shown by the arrows.

Figure 1B:
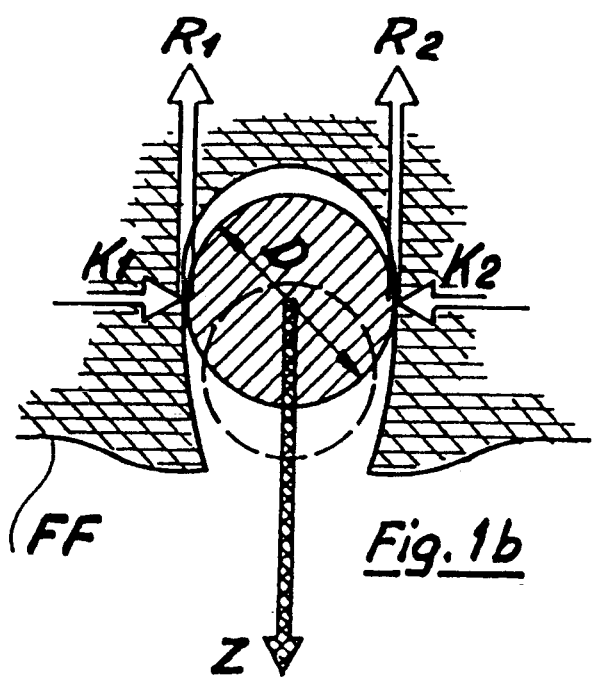

FIG. 1b Another known spiral slot shape with heating conductor during the insertion process.

Figure 1C:
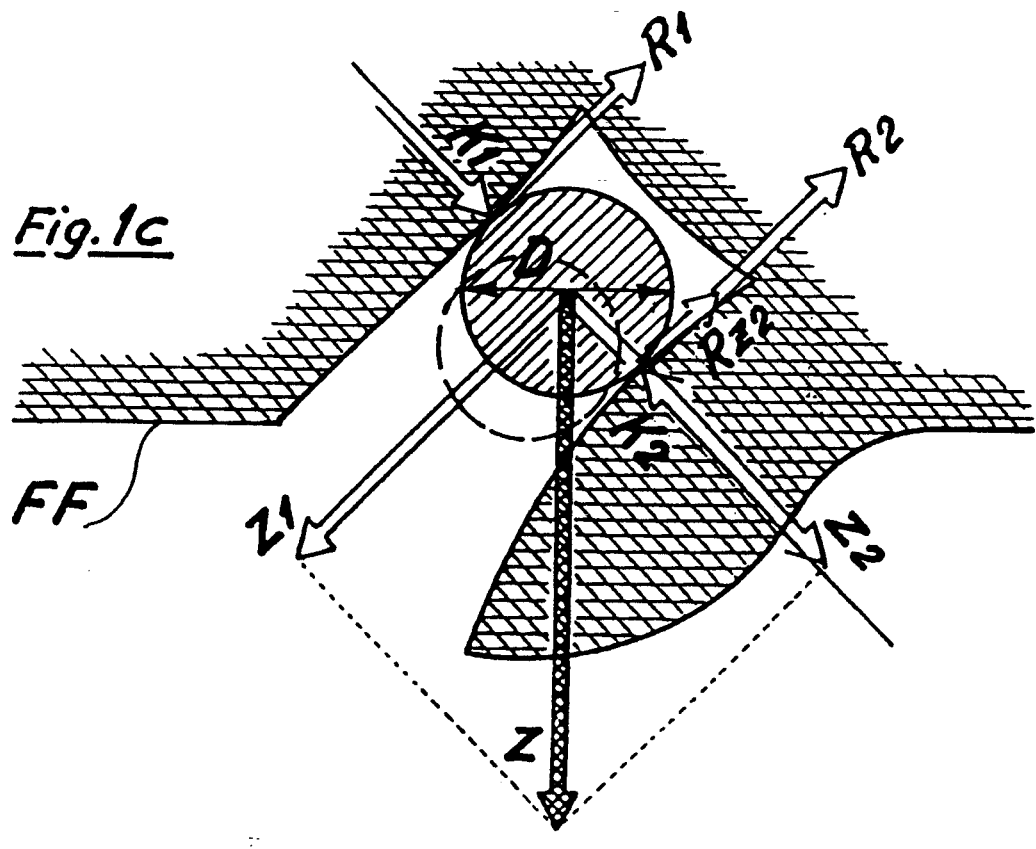

FIG. 1c Another spiral slot shape with heating conductor during the insertion process.

Figure 2A:
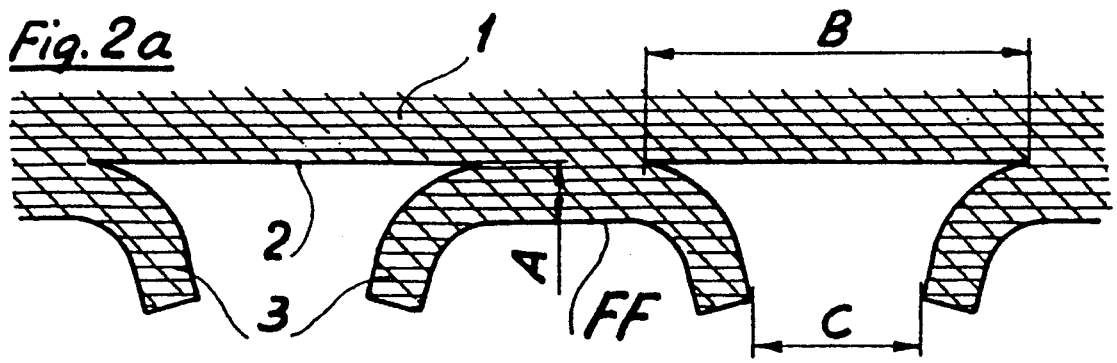

FIG. 2a A first embodiment according to the invention, in partial section through a joining part of a thermoplastic body, e.g. a sleeve body, in which the wire covering is symmetrically rough cut with a not shown, linear, ripping chisel-like blade, centrally separated and radially set up.

Figure 2B:
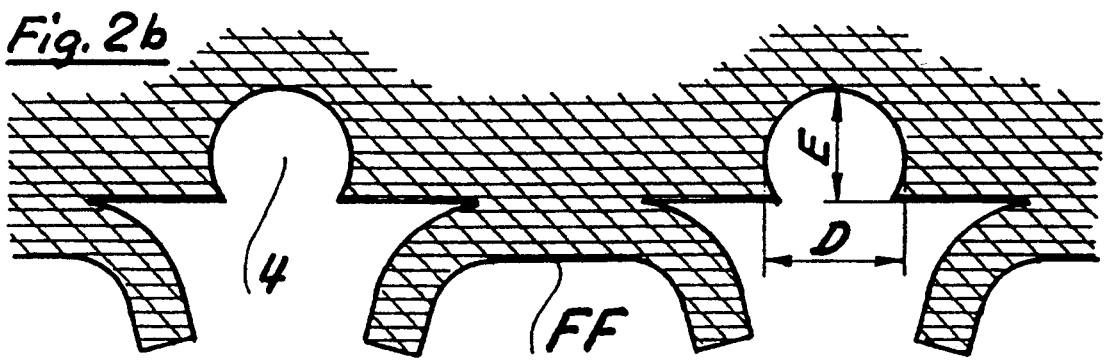

FIG. 2b A deepened (E) wire bed adapted to the selected wire diameter (D), which is machined with a semicircular shaping tool.

Figures 2C, 2D:
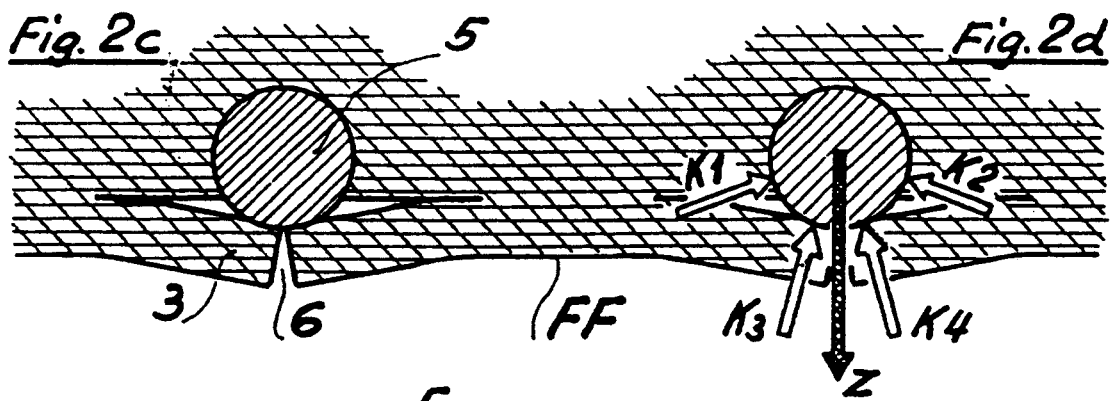

FIG. 2c The corresponding heating conductor inserted in the wire bed, the wire covering subsequently being drawn back against the heating conductor and pressed onto the latter.

FIG. 2d A diagram of the force distribution on the inserted heating conductor in the process step of FIG. 2c.

Figure 2E:
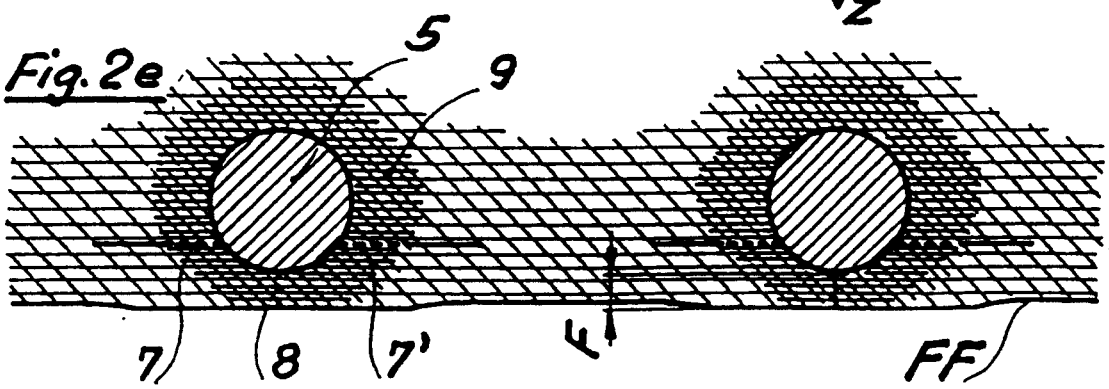

FIG. 2e The section or cutting lines around the wire bed with the completely embedded heating conductor, a not shown setting plug being used for sealing the insertion opening by means of a brief flow of current through the heating conductor in the vicinity of the melting zone 9, i.e. the heating conductor is completely embedded in the fitting material at the dimensionally accurate, predetermined position (value F), the joint surface prepared for welding being smooth without grooves or combs.

FIG. 3a A wire covering rough cut with symmetrically separating, profiled ripping chisel blade and radially set up.

FIGS. 3b to 3e Identical operating steps to FIGS. 2b to 2e.

FIG. 4a A wire covering rough cut with linear, asymmetrical, i.e. single-flute/lip separating ripping chisel blade and radially set up.

FIGS. 4b to 4e Identical operating steps to FIGS. 2b to 2e.

Figure 5A:
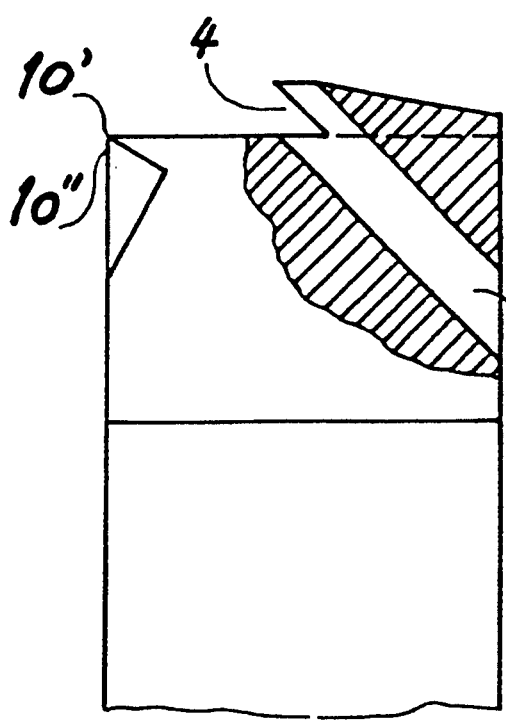
Figure 5B:
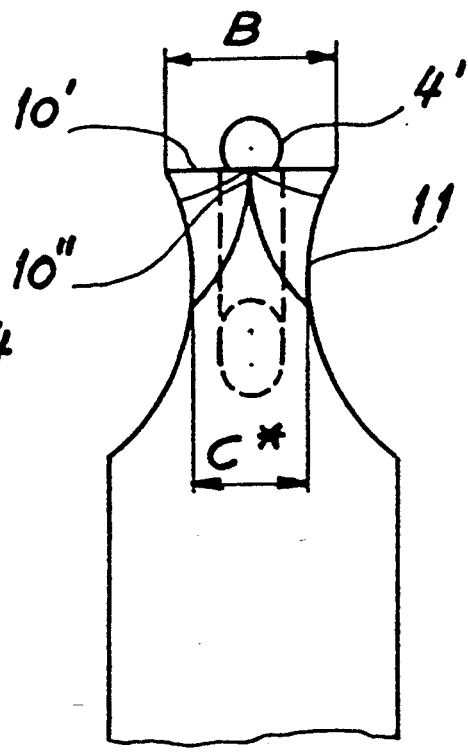

FIGS. 5a and 5b A tool for preparing an underlevel/sublevel wire bed bottom with covering in accordance with the general process step II, here combined as a ripping chisel cutting tool and wire bed machining tool.

Figure 6A:
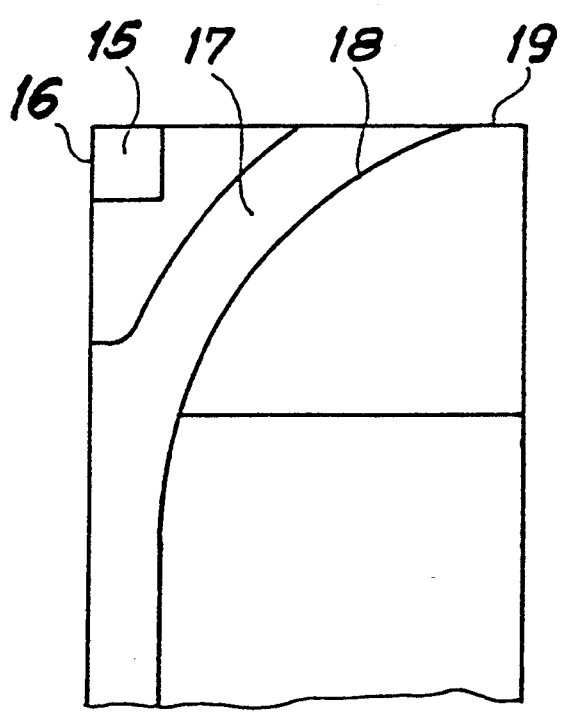
Figure 6B:
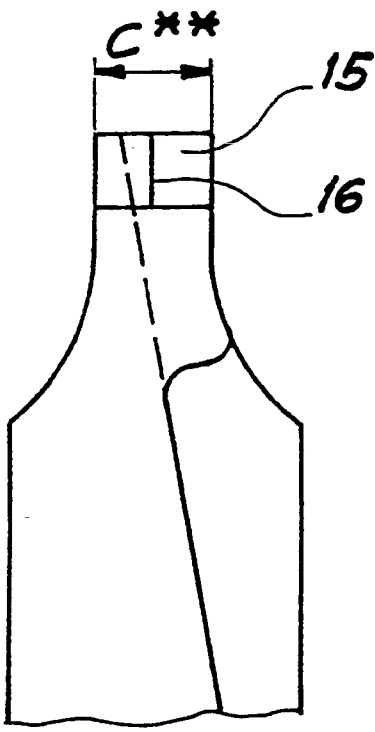

FIGS. 6a and 6b A tool for inserting the heating conductor and subsequently pressing the covering according to general process step III.

FIGS. 7a to 7e A variant, in which the sublevel wire bed bottom is deeper than the wire bed and the wire bed is worked into the covering over the wire bed bottom.

FIGS. 1a to 1c show known embodiments of spiral slot shapes with intimated heating conductor during the insertion process. The influence of the geometrical shape of the spiral slot on the force distribution is indicated by the arrows. These three drawings illustrate the problems to be obviated by the present invention.

The spiral slot shown in longitudinal section through the sleeve body in FIG. 1a is a standard example of a slot geometry produced by machining. Under moderate tensile stress and with the aid of a not shown rolling or sliding wire guide and inserting device, the heating conductor wire is continuously pressed into the somewhat too narrow-cut spiral slot for the wire used. The clamping forces K1 and K2 acting laterally on the heating conductor bring about the frictional forces R1, R2, which act counter to the radial force component Z caused by the tensile stress of the wire. If the clamping forces along the inserted heating conductor wire are sufficiently high and the deflection force on the wire during the insertion process is relatively small, then the conditions exist for a reliable positioning of the wire winding in the sleeve body. The decisive criterion is the association of the wire diameter D and slot width N taking account of manufacturing dimensional tolerances.

If instead of being cut the slot is only widened, then the slot width is much greater than the wire diameter, as is indicated by a dotted line circle. It is then difficult to sufficiently deeply introduce the heating wire into the slot to ensure that it is secured and retained there.

Another procedure for producing spiral slots is the partial machining and ploughing in the same operation and a corresponding groove shape is shown in FIG. 1b. It is noteworthy here that as a result of the displacement action of the correspondingly shaped cutting tool there is a material bead thrown up on both sides of the open groove. With a specially constructed wire guiding and smoothing tool on inserting the heating conductor wire said bead-like material portions can be so pressed against the wire that the latter is at least partly covered, so that during the further manufacture in addition to the frictional forces described in connection with FIG. 1a, the narrowing of the groove opening makes more difficult a slipping out of the heating conductor wire.

In the case of the groove shown in FIG. 1c attention is mainly directed at the formation of a tongue projecting into the sleeve inner face and which is subsequently used in the wire insertion process for the complete covering of the heating conductor. Up to the time where said tongue by heat supply through the heating conductor wire is partly welded to the sleeve material, during the insertion process there is an unstable situation regarding the position of the heating conductor wire in the still open groove. The radial force component Z of the tensile force acting on the wire is split up into the force component pair Z1 and Z2 by the inclined bearing surface. The frictional force Rz2 acting as a result of Z2 is naturally always smaller than Z1. In order to achieve an equilibrium of forces, as described in FIG. 1a, additional frictional forces produced by clamping action between the slot and the wire are necessary. Due note must be taken of the fact that here the clamping action is reduced by the force component Z2. The position of the heating conductor wire is only defined when the sum of R1, R2 and Rz2 is greater than Z1. As the entire force system is influenced by the tension component Z1, it is clear that it is not easy to maintain stable the production sequence using this slot geometry form.

As stated, the aim of the present invention is to eliminate the disadvantages of the known production methods and to fulfill all the criteria of the above-indicated requirements for ensuring a reliable, electric weldable joint or connection.

The general solution idea is the creation of a clearly defined sublevel wire bed and in detail to so geometrically configure the wire slot, that during the insertion process the inserted heating conductor wire is embedded in a dimensionally predetermined position and with a limited spacing from the predetermined joint surface within the sleeve body material and in this way is positively secured. This is brought about by a cutting/machining process, by means of which a depth-defined covering zone is created by the formation of a sublevel wire bed bottom and an embedding zone matched to the wire diameter used. In the embedding zone the heating conductor wire is inserted in shape-adapting manner and the covering zone permits an air-free closing with a cover of clearly defined thickness. As a result a heating conductor wire can be placed in completely air-free manner in a constant embedding depth. As a result of the use of a freely programmable, computer-assisted machining centre the individual operating steps are performed in partly or completely separated manner so as to bring about optimum machine speeds and tool designs.

Using the example of a welding sleeve with a spiral heating conductor arrangement, it is advantageous to perform the prior machine operations, wire insertion, bending back and pressing the wire cover on a commercial CNC lathe with an automatic tool changer and partly extended software functions in a work clamping arrangement.

The operating steps according to FIGS. Xa/Xb can be performed individually and in succeeding manner with separate tools (ripping chisel and machining tool) or simultaneously with a combined special tool (as shown in FIG. 5). The wire insertion, bending back and pressing the wire cover according to FIGS. Xc and Xd are carried out with the aid of a combined special tool. The reliable positioning of the heating conductor after sealing according to FIG. Xe is therefore ensured. For the sealing and smoothing of the joint or jointing surface a further special means is used as part of the production line.

The common steps I to V of the process will be described using the example of a welding sleeve:

I: Preparation of the joint surface

The blank produced by injection moulding or as an extruded pipe portion and in the present case a sleeve blank, is removed from the intermediate store at the end of the aftershrinkage time which depends on the thermoplastic material used. All the machining operations take place on a CNC lathe. The inner part of the blank now undergoes cutting.

II: Working in the wire bed

In the rotary, dimensionally accurate bore and using a lathe tool, which has a ripping chisel-like blade and a transversely positioned cutting edge, the sublevel wire bed bottom with the wire covering shown in FIG. Xa is prepared. In accordance with the layer thickness A the blade width B is chosen in such a way that the desired spacing between the opened covering portions can be maintained without any disturbing deformation thereof. Corresponding to the predetermined wire spacing in the two future welding zones, as well as the central portion provided for the definition thereof, the in each case most favourable pitch or inclination with an optimum gentle transition from one value to another is programmed. Simultaneously, by means of a combined special tool or as an additional step and using the same pitch programme and without damaging the opened wire covering, the profiled wire bed is cut in the sublevel wire bed bottom. Thus, the sleeve is prepared for the insertion of the heating conductor. It is recommended that the wire bed bottom with covering and the wire bed are worked in a single operation using the special tool shown in FIG. 5.

III: Insertion of the heating conductor: With the aid of a profiled wire guidance and insertion finger, combined with a pressing shoe with a guidance and bending portion for the restoring and positioning of the wire covering, the heating conductor is introduced between the bores close to the two faces of the sleeve body and provided for the reception of the contact elements, into the spiral wire bed. For this purpose use is made of the same pitch or inclination parameters as for the formation of the wire bed. As a rule there is only one tool change and a preprogrammed parameter adaptation. As stated, this process takes place separately from the formation of the sublevel wire bed. It is here possible to adapt the speed for the insertion precisely to the wire loading characteristics of the heating conductor to be inserted.

IV: Application of the connecting contact

The smoothing of the joint surface can take place by heating the inserted heating wire. However, before the compressed joints of the cover can be melted together, as the inherent heating power of the inserted heating conductor is used, the free ends of the heating conductor coil must be provided with the contact elements usable for subsequent welding.

V: Closing and smoothing the joint surface

The thus prepared welding sleeve is placed in a press and by means of the contact elements is connected to a suitable power supply. A coolable setting plug is inserted in the sleeve bore provided with the heater coil. The covering layer passing spirally over the heating conductor is pressed against the sleeve body wall and against the inserted heating conductor. In this state briefly sufficient electric power is passed through the heating conductor that the section or cutting lines tightly closed in mechanical manner by the setting plug are melted. On the setting plug through which a cooling medium now flows the smoothed inner surface now solidifies for the dimensionally accurate bore of the finished welding sleeve. This process can be used in the same way for welded rings with external winding, as well as for other random surfaces, particularly planes, where use is made of a pressing plate through which flows a cooling medium. As further, independent production operations are fitted the welding indicator and the central pipe stop ring or collar.

FIGS. 2a–e show an embodiment in which the wire covering is symmetrical to the heating conductor.

According to FIG. 2a in the prepared, smoothly worked thermoplastic body 1, the wire covering 3 using a linear ripping chisel-like blade shown in FIG. 5 is symmetrically rough cut, centrally separated and bent away from the joint surface FF. In completely novel manner this leads to a planar, sublevel wire bed bottom 2 with a clearly defined width B coverable with the cut-out cover or covering 3 in a precisely defined depth level A. The cover strips 3 can be stretched, compressed, plastically deformed and opened for wire insertion by the shaping of the ripping chisel neck and this is indicated by the spacing C and is advantageous for the subsequent covering.

FIG. 2b shows how the wire bed 4 is cut by means of a semicircular shaping tool into the coverable wire bed plane 2. The possibility exists here of accurately adapting the wire bed to the heating conductor and with said tool to create a wire bed with the heating conductor diameter D. The wire bed depth E determines the clamping action necessary for inserting the wire and which can be very accurately adjusted by the cutting or machining operation.

In the next step, as shown in FIG. 2c, the heating conductor is placed in the wire bed 4 through the cover strips 3 open by the spacing C and the strips 3 are subsequently bent back and pressed against the heating conductor 5. The appearance of the as yet to be closed opening 6 of the butt-jointed cover can be significantly controlled by the design of the ripping chisel neck. It has been found that on cutting and opening there is a slight stretching of the cover strips 3, so that in section they have an outwardly directed, slight lobar widening, so that the wire bed is easily accessible on inserting the wire and the closure zone 6 is aided. FIG. 2d shows the diagram of the approximate force distribution on the inserted heating conductor, as shown in FIGS. 1x concerning the prior art. This shows the much more effective application of the clamping forces K1/K2 in the wire bed and the almost ideal force configuration of the holding forces K3/K4 through the cover strips 3, whose force component against the Z-direction is very high. This constitutes a first manufacturing advantage. During insertion the wire cannot slip out of its given position. The part equipped with the heating conductor can be supplied to the next processing step without any rejects.

FIG. 2e shows the state of the sleeve following melting anchoring or sealing of the heating conductor in the sleeve body. The section line 7,7',8, i.e. the wire bed plane 2 and the opening 6, around the wire bed 4 with the inserted wire S were sealed on a not shown setting plug by means of a brief current flow through the heating conductor 5 in the vicinity of the melting zone 9, the heating conductor being completely embedded in the fitting material at the dimensionally accurately predetermined position (value F). The inner surface of the welding sleeve is smooth and has no significant grooves or combs.

Thus, the aforementioned requirements are fulfilled. The heating conductor is at a dimensionally fixed, very small distance from the joint surface in the fitting body, it is completely enveloped by the fitting material without any disturbing air inclusions, the joint surface has, following the introduction of the heating conductor, a smooth and uniform surface area. There are no grooves and bead-like combs, which are prejudicial as a result of the additional insulating air layers between the surfaces to be welded together and also constitute a considerable risk of air inclusion formation during the welding process.

FIGS. 3a–e show an embodiment in which the inner wire bed bottom 2 is convex. This makes it possible to vary the clamping action on inserting the heating conductor and also modify the shape and detail function of the covering 3. This makes clear the possible variations provided by the invention. With regards to the numerous advantageous possibilities offered, two of these will be described hereinafter.

The sublevel wire bed bottom with the wire covering is once again rough cut with a symmetrically separating and profiled ripping chisel blade and is bent radially upwards so as to form an insertion opening. The further process steps according to FIGS. 3b–e are identical to those described in detail relative to FIGS. 2b–e.

FIGS. 4a–e show an embodiment in which the wire covering is rough cut with a linear-asymmetrically separating ripping chisel blade and bent up and away from the joint surface FF. The wire bed bottom below the joint surface is once again planar, but with this cut instead of two equally large cover strips there is one almost twice as large cover strip 3. This embodiment offers advantages if one is e.g. working with a wire inserting tool, which inserts in "sloping" manner, so that in the case of a symmetrical preparation of the wire insert covering one strip would be in the way. This again illustrates the major variations possible with the inventive teaching. The further process steps according to FIGS. 3b–e are identical to those described relative to FIGS. 2b–e.

FIGS. 5a/b show a specific ripping chisel-like tool for producing sublevel wire beds with combined cutting and machining capacity. This tool makes it possible to produce the inventive wire bed in one operation. It is possible to see the tool from the side (5a) and from the front (5b). FIG. 5b reveals the ripping chisel shape shown in the front part with two superimposed, cutting edges 10',10" for cutting the sublevel wire bed bottom of width B, the curved shoulder 11 from the cutting edges for bending up the cover strips to a spacing C* and the attachment 4' for the cutting of the wire bed 4. FIG. 5a shows the channel 14, through which the cut out chip is passed. With the shaping of the shoulder 11 there is a control of the permanent bending up of the covering 3 by plastic deformation and also the degree of plastic deformation of the covering 3, which once again has an influence on the closure scar or pit on the surface (i.e. the joint surface FF) of the part equipped with the heating conductor 5.

FIGS. 6a/b, based on FIGS. 5a/b, show a tool for inserting the heating conductor. The main problem when inserting the heating conductor is the wire guidance, which in the case of simultaneous cutting of any wire pit configuration and simultaneous insertion of the wire therein is not always of an optimum nature due to prejudicial small bending radii. This disadvantage is removed by the inventive sublevel wire bed bottom method. The heating conductor, without prejudicial small radii, can be made to slide in optimum manner into the prepared wire bed.

FIG. 6a shows the insertion tool in the lateral position with a bending wedge, which has a member 16 and bending surfaces 15 for bending up the cover 3 and has a preferably open wire guide 17 in which the wire is placed. The heating conductor is guided along the gently rounded guide surface 18 and passes out below the pressing cam 19, which successively tapers over a not shown surface to the width D. Following the portion 19 is provided a not shown bending back and sliding shoe for the return positioning of the covering 3. FIG. 6b shows the bending wedge from the front, the two bending faces 15 being visible on either side of the member 16. The width C" of the bending wedge is the same or smaller than the bending up width C* according to FIG. 5b. It is also possible to see in FIG. 6b the laterally open wire guide 17, into which instead of having to thread, the heating conductor can be merely inserted. The insertion process can easily be automated as opposed to a threading process. A manipulatable retaining means for the wire can be provided, so as to prevent any dropping out of the guide.

A modification of the inventive procedure is illustrated by FIGS. 7a–e. A sublevel wire bed bottom is formed and on it is placed the wire bed. This variant can be advantageous with special materials.

Figure 7A:
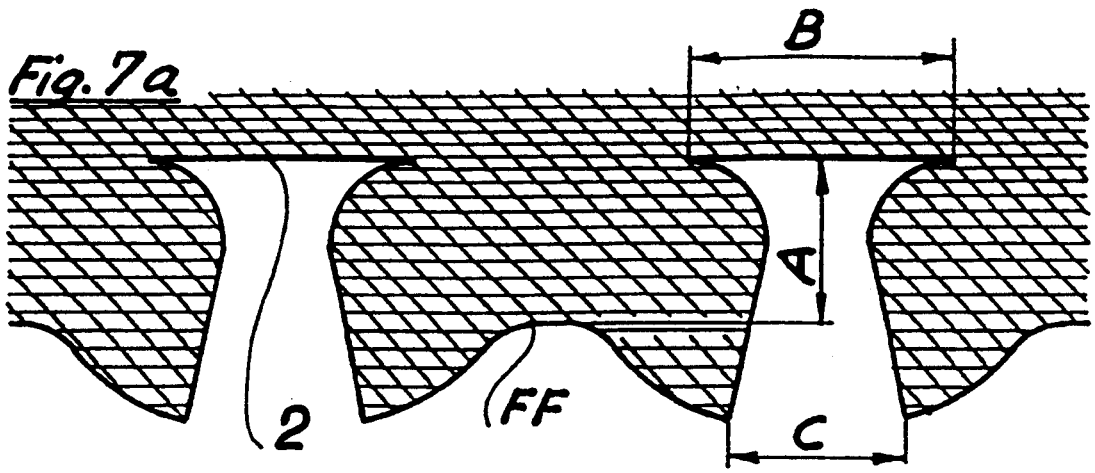
Figure 7B:
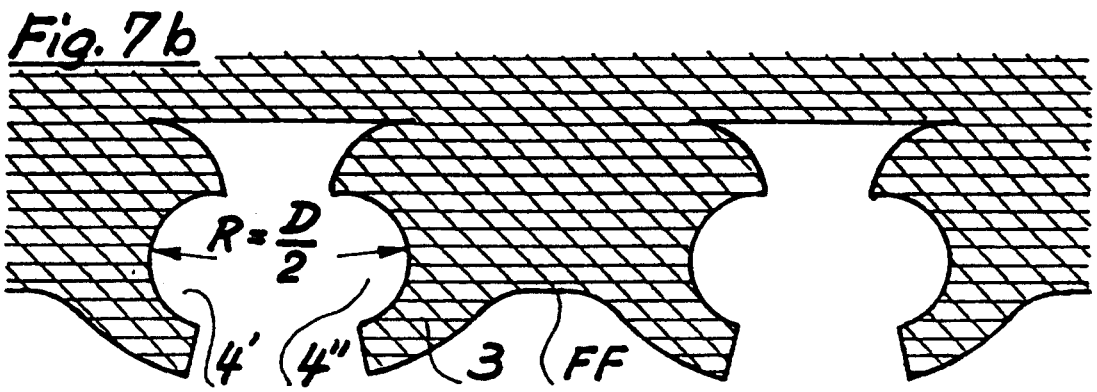
Figures 7C, 7D:
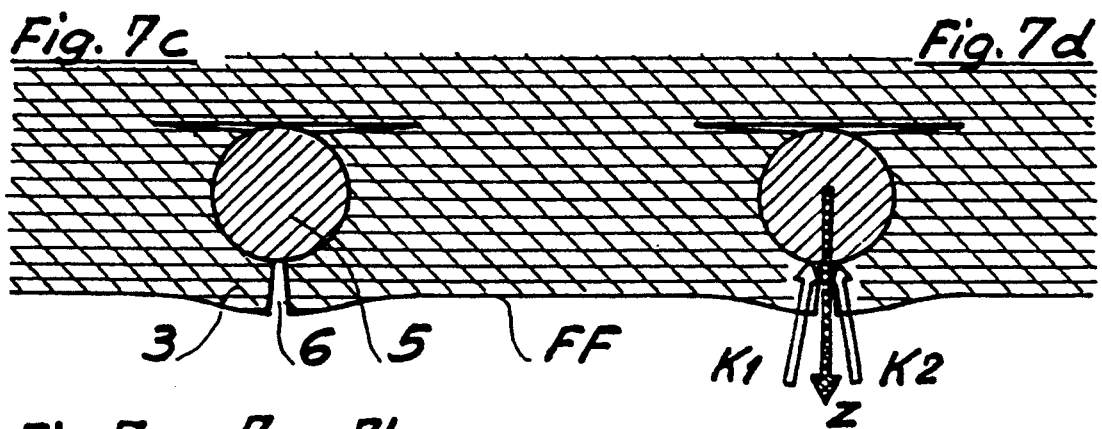
Figure 7E:
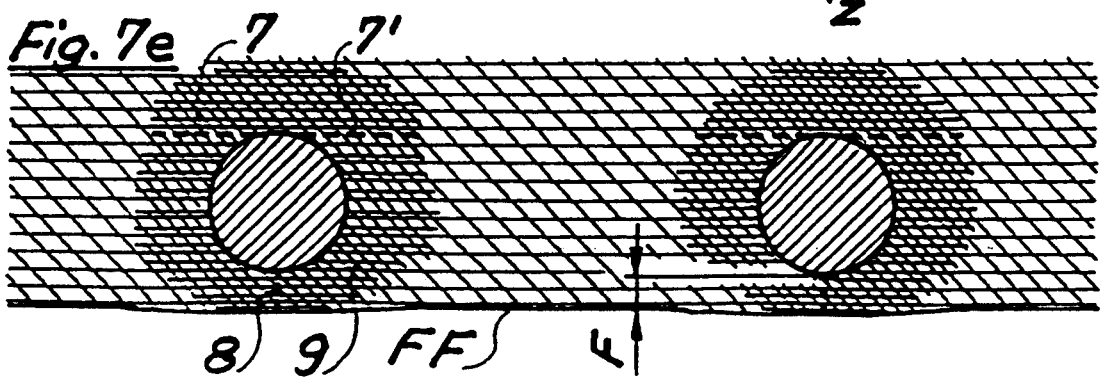

FIG. 7a shows the preparation of the wire bed bottom 2, the depth A being dependent on the heating conductor diameter. The covering 3 is bent up (spacing C), to such an extent that the wire bed can be worked into the joints of the covering, as shown in FIG. 7b. The radii form two wire bed halves 4' and 4", which together surround the heating conductor diameter. After inserting the heating conductor 5 and pressing together the opening 6, as shown in FIGS. 7c and 7d, the heating conductor 5 is so held back counter to the tension Z by the force components K1/K2, that it remains in the wire bed during the insertion process. During the melt anchoring or sealing of the heating conductor in the surrounding thermoplastic material by means of inherent heating, the heating conductor is embedded, as in the previously described embodiments, but now the welding of the section line of the wire bed bottom 7,7' is now on the other side of the heating conductor with the welding scar extending to the surface or joint surface FF. The heating conductor is completely embedded in the material at the positionally accurately predetermined position (value F). The joint surface is smooth, without significant grooves or combs.

As has been mentioned hereinbefore this method for the formation of a sublevel wire bed maintaining a spacing with respect to the joint surface and with a clearly defined wire bed covering can also be used for other thermoelectrically weldable surfaces. It can also be used where there are only partial welding zones.

The process for producing a thermoelectrically weldable zone in thermoplastic materials is significantly improved by the true-to-size, air-free embedding of the heating conductor at a clearly defined depth below the joint face. For this purpose in a first process step a sublevel wire bed bottom is cut into the material, in which using a suitable tool is cut in the desired depth measured from the material surface an inverted T-shaped incision running in two planes and, following the surface profile, the cut is passed along the heating conductor insertion line. Using the same tool the cover strips formed are raised along the cut path and stretched, which leads to the formation of an open channel with the sublevel wire bed bottom. Preferably in the same operation the wire bed is correspondingly cut true-to-size, corresponding to the heating conductor, using a cutting tool. In a subsequent process step the heating conductor is inserted through the still open channel and the cover strips pressed down and finally melted. What is left is a groove-free, smooth joint surface, over which there is a fine, scarcely raised melt scar.

I claim:

1. A method for producing a thermoelectrically weldable zone in a body of thermoplastic material comprising the steps of cutting a surface of the material to concurrently form a first incision generally perpendicular to the surface and second incisions extending laterally from the first incision a preselected depth from the surface, thereby forming flaps, bending the flaps outwardly to form between the flaps a channel having a bottom at the preselected depth from the surface of the body, removing material to form a groove shaped and dimensioned to closely receive a heating wire, placing the heating wire in the groove, and returning the flaps into the channel substantially to the positions occupied by the material of the flaps before formation of the first and second incisions.

2. A method according to claim 1 wherein, in the step of removing material, the material is removed from the bottom of the channel.

3. A method according to claim 1 wherein, in the step of removing material, the material is removed substantially equally from inwardly facing surfaces of the flaps.

4. A method according to claims 1 wherein the step of returning the material includes
   connecting a source of current to ends of the inserted wire,
   passing sufficient current through the wire to heat only the wire and the material of the body adjacent the incisions, and
   concurrently with passing current through the wire, pressing the surface of the body along and on both sides of the first incision to close the incisions without entrapped air.

5. A method according to claim 4 wherein the body has a generally cylindrical surface and the first incision follows a helical path along the cylindrical surface.

6. A method according to 1 wherein said channel bottom is substantially planar and parallel with the surface of the body, as viewed in section.

7. A method according to claim 1 wherein said channel bottom is generally convex relative to the surface of the body, as viewed in section.

8. A method for producing a thermoelectrically weldable zone in a body of thermoplastic material comprising the steps of
   cutting a surface of the material to concurrently form a first incision generally perpendicular to the surface and a second incision extending laterally from the first incision a preselected depth from the surface and substantially parallel with the surface, thereby forming a flap,
   bending the flap outwardly to form a channel having a bottom along the second incision at the preselected depth from the surface of the body with the flap at one side thereof,
   removing material from the bottom to form a groove shaped and dimensioned to closely receive a heating wire,
   placing the heating wire in the groove, and
   returning the flap into the channel substantially to the position occupied by the material of the flap before formation of the first and second incisions.

9. A method according to claim 8 wherein the step of returning the material includes
   connecting a source of current to ends of the inserted wire,
   passing sufficient current through the wire to heat only the wire and the material of the body adjacent the incisions, and
   concurrently with passing current through the wire, pressing the surface of the body along the first incision to close the incisions without entrapped air.

10. A method for producing a thermoelectrically weldable zone in a body of thermoplastic material comprising the steps of cutting a surface of the material to concurrently form a first incision generally perpendicular to the surface and second incisions extending laterally from the first incision a preselected depth from the surface, thereby forming flaps, the predetermined depth being greater than the diameter of a wire to be embedded in the material,
    bending the flaps outwardly to form between the flaps a channel having a bottom at the preselected depth from the surface of the body, the flaps having inwardly facing surfaces,
    removing material from the inwardly facing surfaces of the flaps to form halves of a groove shaped and dimensioned to closely receive a heating wire,
    placing the heating wire between the flaps in the groove, and
    returning the flaps into the channel substantially to the positions occupied by the material of the flaps before formation of the first and second incisions.

11. A method according to claim 10 wherein the step of returning the material includes connecting a source of current to ends of the inserted wire,
    passing sufficient current through the wire to heat only the wire and the material of the body adjacent the incisions, and
    concurrently with passing current through the wire, pressing the surface of the body along and on both sides of the first incision to close the incisions without entrapped air.

* * * * *